US010638375B2

(12) United States Patent
Jeong et al.

(10) Patent No.: US 10,638,375 B2
(45) Date of Patent: Apr. 28, 2020

(54) VIDEO TELEPHONY SERVICE QUALITY ENHANCEMENT METHOD AND APPARATUS

(71) Applicant: Samsung Electronics Co., Ltd., Suwon-si, Gyeonggi-do (KR)

(72) Inventors: Sangsoo Jeong, Suwon-si (KR); Hyejeong Kim, Suwon-si (KR); Songyean Cho, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/133,265

(22) Filed: Sep. 17, 2018

(65) Prior Publication Data

US 2019/0021028 A1    Jan. 17, 2019

Related U.S. Application Data

(63) Continuation of application No. 14/626,700, filed on Feb. 19, 2015, now Pat. No. 10,098,044.

(30) Foreign Application Priority Data

Feb. 20, 2014  (KR) .................. 10-2014-0019921
May 23, 2014  (KR) .................. 10-2014-0062053

(51) Int. Cl.
*H04W 36/00*        (2009.01)
(52) U.S. Cl.
CPC .............. *H04W 36/0022* (2013.01)
(58) Field of Classification Search
CPC .................................. H04W 36/0022
See application file for complete search history.

(56) References Cited

U.S. PATENT DOCUMENTS 8,504,017 B1    8/2013  Hietalahti et al.
8,547,969 B2   10/2013  Wafta et al.
(Continued)

FOREIGN PATENT DOCUMENTS

CN        101820658 A     9/2010
JP       2014502096 A     1/2014
(Continued)

OTHER PUBLICATIONS

First Office Action regarding Chinese Patent Application No. 201580014485.2, dated Mar. 5, 2019, 21 pages.
(Continued)

*Primary Examiner* — Jason E Mattis

(57) ABSTRACT

A communication method and apparatus is provided for enhancing video telephony service quality by protecting against call setup failure or service quality degradation caused due to switching of the User Equipment (UE) to a network which does not fulfill the data rate required for video telephony in the video call setup process. The communication method of a terminal in a mobile communication system according to the present disclosure includes transmitting a video telephony call setup request message, receiving a switching command for Circuit Switched Fall Back (CSFB), and setting, if the switching command includes a target cell type set to the 2nd Generation (2G) cell and if a 3rd Generation (3G) cell to which the terminal can access exists, up the video telephony call by switching a connection to the 3G cell.

20 Claims, 15 Drawing Sheets

(56) References Cited

U.S. PATENT DOCUMENTS

| | | | |
|---|---|---|---|
| 2008/0176565 | A1 | 7/2008 | Eerolainen et al. |
| 2010/0296421 | A1 | 11/2010 | Watfa et al. |
| 2011/0090872 | A1 | 4/2011 | Dahlen et al. |
| 2011/0110302 | A1* | 5/2011 | Faurie ............... H04W 36/0022 370/328 |
| 2011/0256855 | A1 | 10/2011 | Wang |
| 2012/0120789 | A1 | 5/2012 | Ramachandran et al. |
| 2013/0044613 | A1 | 2/2013 | Edara et al. |
| 2013/0063540 | A1 | 3/2013 | Zisimopoulos et al. |
| 2013/0094472 | A1 | 4/2013 | Klingenbrunn et al. |
| 2013/0120519 | A1 | 5/2013 | Jin et al. |
| 2013/0136115 | A1 | 5/2013 | Moisanen et al. |
| 2013/0278707 | A1 | 10/2013 | Yang |
| 2013/0287007 | A1 | 10/2013 | Wu et al. |
| 2014/0016562 | A1 | 1/2014 | Watfa et al. |
| 2014/0233529 | A1* | 8/2014 | Prakash ............ H04W 36/0022 370/331 |
| 2016/0100337 | A1* | 4/2016 | Wu .................... H04L 65/1096 370/331 |

FOREIGN PATENT DOCUMENTS

| | | | |
|---|---|---|---|
| KR | 10-2011-0134937 | A | 12/2011 |
| WO | 2013029639 | A1 | 3/2013 |
| WO | 2013172656 | A1 | 11/2013 |

OTHER PUBLICATIONS

International Search Report dated May 19, 2015 in connection with International Application No. PCT/KR2015/001633; 3 pages.

Qualcomm; "Circuit-Switched Fallback: The First Phase of Voice Evolution for Mobile LTE Devices"; retrieved from https://qualcomm.com.website; Jul. 18, 2013; 12 pages.

Extended European Search Report, dated Sep. 11, 2017, regarding Application No. EP15751859.8, 13 pages.

"3rd Generation Partnership Project; Technical Specification Group Services and Systems Aspects; Circuit Switched (CS) fallback in Evolved Packet Systems (EPS); Stage 2 (Relase 9)", 3GPP TS 23.272 V9.13.0 (Dec. 2012) Technical Specification, Dec. 2012, 73 pages.

Japan Patent Office, "Notice of Reasons for Refusal," Application No. JP 2016-553514, dated Nov. 12, 2018, 9 pages.

Huawei, et al., "CSFB optimization based on SRVCC," S2-095143, SA WG2 Temporary Document, 3GPP TSG-SA WG2 Meeting #75, Koyto, Japan, Aug. 31-Sep. 4, 2009, 12 pages.

Intellectual Property India, Examination Report dated Jan. 24, 2020 regarding Application No. 201637028017, 9 pages.

* cited by examiner

VIDEO TELEPHONY SERVICE QUALITY ENHANCEMENT METHOD AND APPARATUS

CROSS-REFERENCE TO RELATED APPLICATIONS AND CLAIM OF PRIORITY

The present application is a continuation of application Ser. No. 14/626,700, filed Feb. 19, 2015, which is based on and claims priority under 35 U.S.C. 119(a) to Korean Application No. 10-2014-0019921 filed on Feb. 20, 2014 and Korean Application No. 10-2014-0062053 filed on May 23, 2014 in the Korean Intellectual Property Office, respectively, the contents of which are incorporated herein by reference.

BACKGROUND

1. Field

The present disclosure relates to selecting an access network to establish a connection for video telephony in a mobile communication network. In particular, the present disclosure relates to a method and apparatus for enhancing video telephony service quality by protecting against call setup failure or service quality degradation caused due to switching of the user equipment (UE) to a network which does not fulfill the data rate required for video telephony in the video call setup process.

2. Description of Related Art

Mobile communication systems were developed to provide the subscribers with voice communication services on the move. With the rapid advance of technologies, the mobile communication systems have evolved to support high speed data communication services beyond the early voice-oriented services. However, the limited resource and user requirements for higher speed services in the current mobile communication system spur the evolution to more advanced mobile communication systems.

As one of the next-generation mobile communication systems to meet such requirements, standardization for a Long Term Evolution (LTE) system is underway in the 3rd Generation Partnership Project (3GPP). LTE is a technology designed to provide high speed packet-based communication of up to 100 Mbps and aims at commercial deployment around 2010 timeframe. In order to accomplish the aim, a discussion is being held on several schemes: one scheme for reducing the number of nodes located in a communication path by simplifying a configuration of the network and another scheme for maximally approximating wireless protocols to wireless channels.

FIG. 1 illustrates a typical LTE mobile communication system architecture.

Referring to FIG. 1, the radio access network of the LTE mobile communication system includes next generation base stations (hereinafter, referred to interchangeably as Evolved Node B (eNB), UTRAN, and Node B) 105, 110, 115, and 120, a Mobility Management Entity (MME) 125, and a Serving-Gateway (S-GW) 130.

The UE 135 connects to an external network via eNBs 105, 110, 115, and 120 and the S-GW 130, and Packet Data Network (PDN) Gateway (P-GW) (not shown).

The eNB is a Radio Access Network (RAN) node corresponding to the Radio Network Controller (RNC) of the Universal Terrestrial Radio Access Network (UTRAN) and the base station controller of the GSM EDGE Radio Access Network (GERAN). The eNBs 105, 110, 115, and 120 are connected to the UE 100 through a radio channel and responsible for the role of legacy RNC/BSC. An eNB can serve several cells.

In the LTE system, all the user traffic including real time services such as Voice over Internet Protocol (VoIP) is served through a shared channel and thus there is a need of a device capable of collecting status information of the UEs and scheduling the UEs. The eNB is responsible for collecting the status information of the UEs and scheduling the UEs based thereon.

The S-GW 130 is an entity responsible for providing data bearer and establishes or releases the data bearer under the control of the MME 120.

Although not depicted, the core network of the LTE mobile communication system further includes an Application Function (AF), a Policy and Charging Rules Function (PCRF), and a P-GW in addition to the above-described MME 120, and S-GW 130.

The AF is an entity responsible for exchanging information related to application with the user on the application level.

The PCRF is an entity for controlling the policy related to Quality of Service (QoS) and transfers the Policy and Charging Control (PCC) rule to the P-GW. The PCRF is an entity of controlling the QoS and billing for the traffic.

Meanwhile, the term "UP" denotes the paths connecting between the UE 100 and one of the RAN nodes 105, 110, 115, and 120; between the RAN node and the S-GW 130; and between the S-GW 130 and the P-GW (not shown). Among them, the path between the UE 100 and the RAN node is the most resource-restrictive radio channel.

In the radio communication system such as LTE, QoS is applied per Evolved Packet System (EPS) bearer. An EPS bearer is used to transmit the IP flows requiring the same QoS. The EPS bearer is designated parameters related to QoS such as QoS Class Identifier (QCI) and Allocation and Retention Priority (ARP). The QCI is a parameter defined as an integer indicating QoS priority, and the ARP is a parameter for use in determining whether to accept or reject new EPS bearer establishment.

The EPS bearer corresponds to the Packet Data Protocol (PDP) context of the General Packet Radio Service (GPRS). An EPS bearer belongs to a PDN connection which has the Access Point Name) as an attribute. When a PDN connection for IP multimedia Subsystem (IMS) service such as Voice over LTE (VoLTE), the corresponding PDN connection is established using the well-known IMS APN.

In order to support voice telephony in the LTE network, the Packet Switched (PS) mode IMS-based VoLTE or the Circuit Switched Fall Back (CSFB) reuses the Circuit Switched (CS) mode of the $2^{nd}$ Generation or $3^{rd}$ Generation (2G/3G) system. VoLTE is the term used in the same concept as Voice over IMS (VoIMS). Typically, the 2G system denotes Global System for Mobile Communications (GSM) or the system using the GSM EDGE Radio Access Network (GERAN) as the Radio Access Network (RAN), and the 3G system denotes the Universal Mobile Telecommunications System (UMTS) or the system using the Universal Terrestrial Radio Access Network (UTRAN) and the RAN.

In the radio communication system, particularly the LTE system, if an inbound or outbound voice call occurs if the UE is connected to the LTE network, the CSFB procedure is executed for switching to the CS network. In this case, a UE authentication procedure is performed so as to cause voice telephony service delay. Typically, the 2G/3G system is a CS network capable of providing CS service, and the CS service-related control entity is the Mobile Switching Center (MSC) or Visitor Location Register (VLR). The CSFB responsible for the function of switching to the CS service is performed using the SG's interface between the MSC/VLR and MME.

SUMMARY

If a video telephony is made to the UE, it is necessary to set up the call through a network supporting the data rate required for the video telephony. Typically, the video telephony consists of audio and video data and thus requires high data rate as compared with the voice telephony. If a video telephony is made in the state that the UE is connected to the LTE system, it is necessary to switch the UE to a network supporting video telephony; however, if the LTE system fails to identify the video telephony and switches the UE to a network that does not support video telephony or a network, that supports the video telephony, with insufficient data transmission resource (such as a 2G network), the video telephony results in call setup failure or service quality degradation.

To address the above-discussed deficiencies, it is a primary object to provide a video telephony service quality enhancement method and apparatus that is capable of switching, if a video telephony is made, the UE to the network supporting the video telephony immediately.

Also, the present disclosure aims to provide a video telephony service quality enhancement method and apparatus that is capable of preventing the UE from being switched to a network which does not support the video telephony or, although it supports, has insufficient data transmission resource (such as a 2G network) and switching the UE to the network suited for the video telephony so as to protect against call setup failure or service quality degradation.

The objects of the present disclosure are not limited to the aforesaid, and other objects not described herein with be clearly understood by those skilled in the art from the descriptions below.

In accordance with various embodiments of the present disclosure, a communication method of a terminal in a mobile communication system is provided. The communication method includes transmitting a video telephony call setup request message, receiving a switching command for Circuit Switched Fall Back (CSFB), and setting, if the switching command includes a target cell type set to the $2^{nd}$ Generation (2G) cell and if a $3^{rd}$ Generation (3G) cell to which the terminal can access exists, up the video telephony call by switching a connection to the 3G cell. The communication method further includes receiving a measurement report request message from a base station and transmitting a measurement report message including information only on 3G cell measurement report. Transmitting the measurement report message includes performing, when the measurement report request message includes measurement target information indicating both the 2G and 3G cells, measurement only on the 3G cells and transmitting the measurement report message including the information on the 3G cell measurement report to the base station.

Transmitting the measurement report message includes performing measurement on both the 2G and 3G cells and transmitting the measurement report message excluding the information on 2G cell measurement result. The video telephony call setup request message includes information informing that a request service is a video telephony service. Setting up the video telephony call includes searching, if an attempt of the video call setup to the 2G cell fails, for the 3G cells accessible and switching to one of found 3G cells to perform the video telephony call setup.

Transmitting the video telephony call setup request message includes searching, if the terminal is in an idle mode, for 3G cells accessible and switching to one of found 3G cells to perform the video telephony call setup. Setting up the video telephony call includes checking, if the switching command is a Radio Resource Control (RRC) connection release message and if the switching command includes no switching target cell information, priorities of 2G and 3G frequencies, searching, if the priority of the 2G frequency is higher than the 3G frequency, for 3G cells accessible, and switching to the 3G cell for the video telephony call setup.

In accordance with various embodiments of the present disclosure, a communication method of a base station in a mobile communication system is provided. The communication method includes receiving a video telephony call setup request message from a terminal, receiving a message including a Circuit Switched Fall Back (CSFB) execution command from a Mobility Management Entity (MME), transmitting a measurement report request message from the terminal, receiving a measurement report message including information only on $3^{rd}$ Generation (3G) cell measurement result from the terminal, selecting a target cell for switching a connection of the terminal based on the measurement report message, and transmitting a switching command including information on the target cell to the terminal. The message including the CSFB execution command comprises information notifying that the CSFB is required for video telephony call setup.

Transmitting the measurement report request message includes transmitting the measurement request message including a measurement cell type set to 3G cell. The message including the CSFB execution command includes a Handover Restriction List (HRL) including information indicating that access to 2G cell is forbidden. The communication method further includes receiving a paging message including information notifying of occurrence of a mobile terminating video telephony call from the MME.

In accordance with various embodiments of the present disclosure, a communication method of a Mobility Management Entity (MME) in a mobile communication system is provided. The communication method includes receiving a video telephony call setup request message from a terminal and transmitting a message including a Circuit Switched Fall Back (CSFB) execution command from a base station, wherein the message including the CSFB execution command comprises information notifying that the CSFB is required for video telephony call setup. The communication method further includes receiving a paging message including information notifying of a mobile terminating video telephony call occurrence from a Mobile Switching Center (MSC) and transmitting a message notifying of the mobile terminating video telephony call occurrence to at least one of the base station and the terminal.

In accordance with various embodiments of the present disclosure, a terminal of a mobile communication system is provided. The terminal includes a transceiver which is responsible for communication with other network entities and a control unit which controls transmitting a video telephony call setup request message, receiving a switching command for Circuit Switched Fall Back (CSFB), setting, if the switching command includes a target cell type set to the $2^{nd}$ Generation (2G) cell and if a $3^{rd}$ Generation (3G) cell to which the terminal can access exists, up the video telephony call by switching a connection to the 3G cell.

In accordance with various embodiments of the present disclosure, a base station of a mobile communication system is provided. The base station includes a transceiver which is responsible for communication with other network entities and a control unit which controls receiving a video telephony call setup request message from a terminal, receiving a message including a Circuit Switched Fall Back (CSFB) execution command from a Mobility Management Entity (MME), transmitting a measurement report request message from the terminal, receiving a measurement report message including information only on 3$^{rd}$ Generation (3G) cell measurement result from the terminal, selecting a target cell for switching a connection of the terminal based on the measurement report message, and transmitting a switching command including information on the target cell to the terminal.

In accordance with various embodiments of the present disclosure, a Mobility Management Entity (MME) of a mobile communication system is provided. The MME includes a transceiver which is responsible for communication with other network entities and a control unit which controls receiving a video telephony call setup request message from a terminal and transmitting a message including a Circuit Switched Fall Back (CSFB) execution command from a base station, wherein the message including the CSFB execution command comprises information notifying that the CSFB is required for video telephony call setup.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
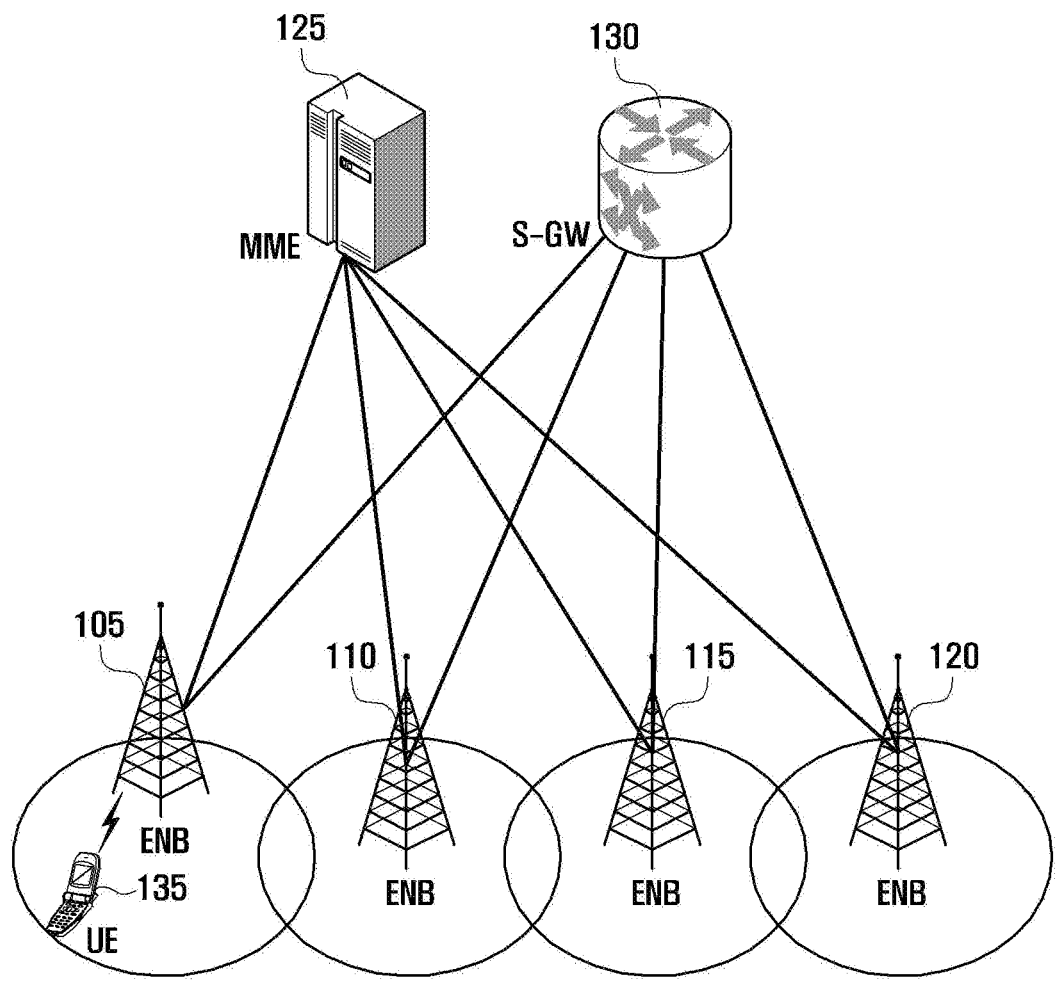
FIG. 1 illustrates a typical LTE mobile communication system architecture.

FIGS. 1 through 15, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communications system. Exemplary embodiments of the present disclosure are described with reference to the accompanying drawings in detail. The same reference numbers are used throughout the drawings to refer to the same or like parts. Detailed description of well-known functions and structures incorporated herein can be omitted to avoid obscuring the subject matter of the present disclosure. Further, the following terms are defined in consideration of the functionality in the present disclosure, and vary according to the intention of a user or an operator, usage, etc. Therefore, the definition should be made on the basis of the overall content of the present specification.

Although the description is directed to the OFDM-based radio communication system, particularly the 3GPP EUTRA, it will be understood by those skilled in the art that the present disclosure can be applied even to other communication systems having the similar technical background and channel format, with a slight modification, without departing from the spirit and scope of the present disclosure. In the present disclosure, the term 'LTE system' is used in the meaning including the LTE-Advanced (LTE-A) system.

In various embodiments of the present disclosure, the terminal is fixed or mobile and referred to as Mobile Station (SM), Mobile Terminal (MT), User Terminal (UT), Subscriber Station (SS), Wireless Device, Personal Digital Assistant (PDP), Wireless Modem, and handheld. Also, the terminal can be referred to interchangeably as terminal device, user, and User Equipment (UE).

Although the embodiments of the present disclosure are directed to the CSFB procedure switching the UE form the LTE network to the CS network for voice service, the subject matter of the present disclosure is to simplify the authentication or security information exchange necessary for switching from one system to another for a specific service, and it will be understood by those skilled in the art that the present disclosure can be applied even to other communication systems or services having the similar technical background with a slight modification, without departing from the spirit and scope of the present disclosure.

In the specification and drawings, the term "LTE network" is used interchangeably with the E-UTRAN and the CS network can be UTRAN, GERAN, CDMA200, and the like supporting CS services and referred to as legacy network generically. In the specification and drawings, when the UE exists in one network, this means that the UE is connected to the network or camped on the network in the idle state. The term "base statin" corresponds to "eNB" in the E-UTRAN. In the specification and drawings, the Home Subscriber Server (HSS) can be an entity identical with or physically attached to the Home Location Register (HLR).

The mobile originating video telephony call and mobile terminating video telephony call processing procedures, according to the various embodiments of the present disclosure, are described separately hereinafter.

Figure 2:
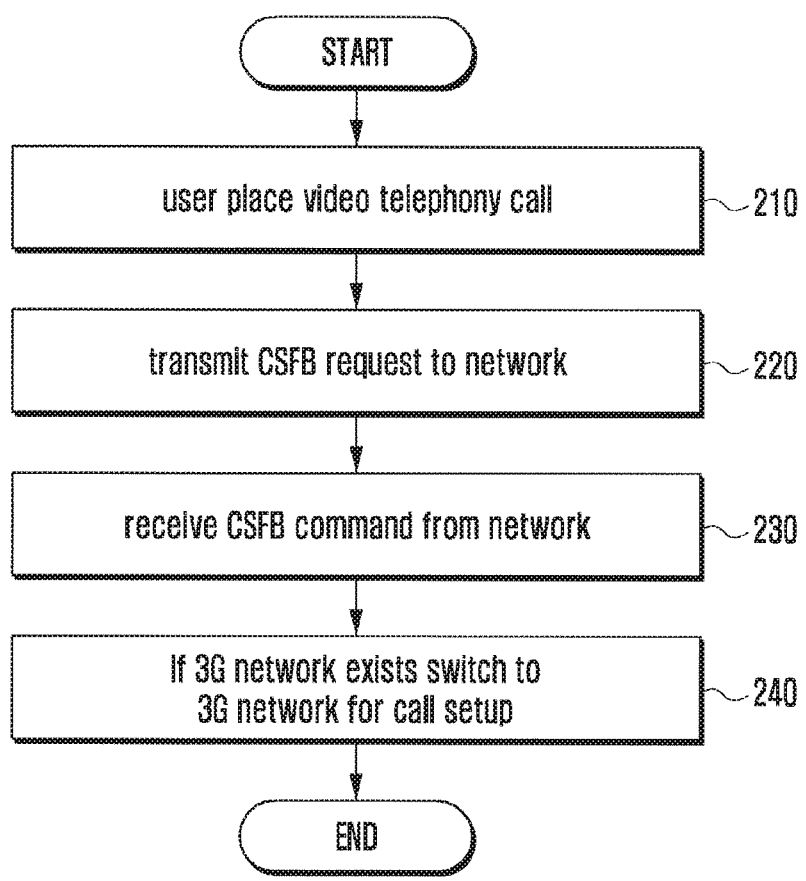
FIG. 2 illustrates an exemplary process for a UE operation for processing the mobile originating video telephony call according to various embodiments of the present disclosure.

FIG. 2 illustrates an exemplary process for a UE operation for processing the mobile originating video telephony call according to certain embodiments of the present disclosure.

In step 210, the user places a video call in the state of being camped on an LTE network. In step 220, the UE transmits a call setup request message to the connected operator network. When the UE has CSFB capability, the UE sends the operator network an extended service request message to notify of the necessity of CSFB.

When the operator network supports CSFB, the operator network sends the UE a command for switching to a 2G or 3G network, such as a CSFB execution command. According to certain embodiments, the command is one of Handover (HO) command, Network Assisted Cell Change (NACC), and Radio Resource Control (RRC) connection release.

In step 230, the UE receives a message including the switching command, such as CSFB execution command, from the operator network. Upon receipt of the switching command, the UE selects a 2G or 3G cell and switches to the selected 2G or 3G cell based on the information included in the switching command message at step 240.

When the command for cell switching to the 3G cell and call setup is received from the operator network, the UE attempts switching to the 3G network and performing call setup.

In certain embodiments, the operator network commands to connect to the 2G cell or provides the information on the 2G cell even though there is the 3G cell to which the UE can connect. A situation occurs when the current channel condition of the UE is better with the 2G network than with the 3G network or depending on the numbers of the UEs connected to the respective networks. In certain embodiments, to improve the video telephony success probability or service quality, the UE selects the 3G cell instead of the 3G cell autonomously and performs video call setup at step 240. Although the operator network commands to switch to the 2G cell, the UE switches to the 3G network to attempt call setup.

Figure 3:
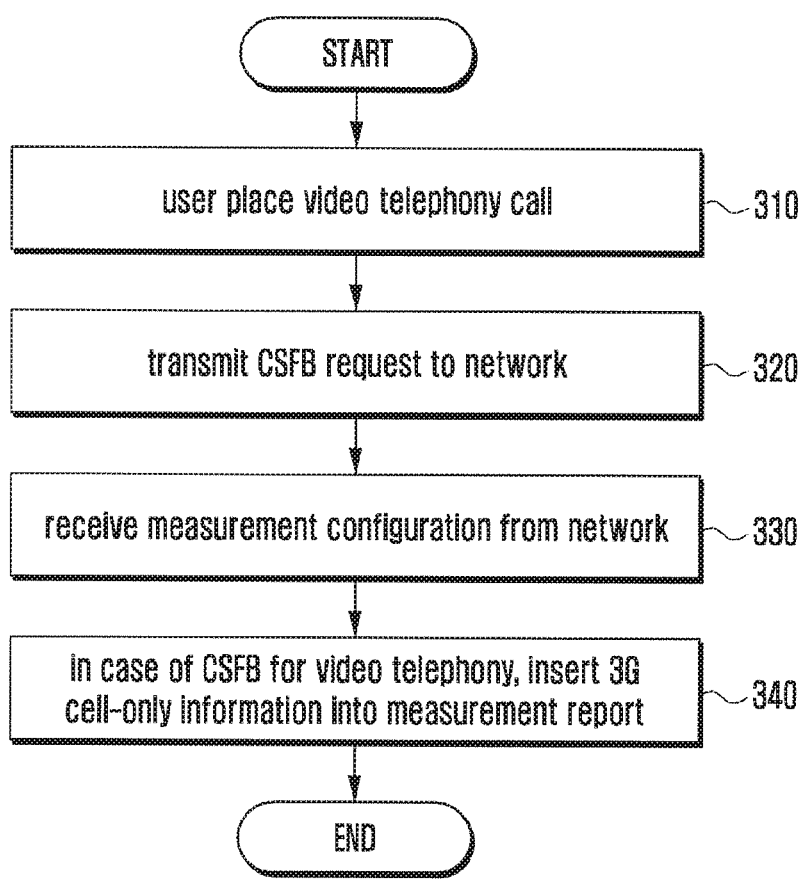
FIG. 3 illustrates an exemplary process for a UE operation for processing the mobile originating video telephony according to various embodiment of the present disclosure.

FIG. 3 illustrates an exemplary process for a UE operation for processing the mobile originating video telephony according to various embodiments of the present disclosure.

Referring to FIG. 3, the UE attempts CSFB for video telephony through a 3G cell using the measurement report.

In step 310, the user places a video call in the state that the UE is camped on the LTE network. In step 320, the UE sends a call setup request message to the currently connected operator network. When the UE has the CSFB capability, the UE sends the operator network the Extended Service Request message to notify of the necessity of CSFB.

When the CSFB request is received from the UE, the operator network sends the UE a measurement execution or measurement result report command to collect information for used in selecting a target cell to switch. In step 330, the UE receives a message including the measurement configuration information from the operator network. Upon receipt of this message, the UE performs measurement based on the measurement configuration and reports the measurement result to the operator network.

In step 340, although a 2G cell is accessible and measurement information is available to report, the UE may not include the measurement information about the 2G cell in the measurement report message transmitted to the operator network. The UE includes the information informing that there is no accessible 2G cell in the measurement report message. Accordingly, the operator network takes the 3G cells into consideration to select a target cell for CSFB and switch the UE to the 3G network.

According to certain embodiments, although the 2G and 3G cells are indicated as measurement targets in message including the measurement configuration information which is received at step 320, the UE performs measurement only to the 3G cell but not to the 2G cell to generate a report message. The UE also performs measurement to 2G and 3G cells according to the measurement configuration information included in the message received at step 330 and, when a 3G cell is found, report on the information on the 3G cell to the operator network. When only the 2G cells are found as a result of performing measurement for both the 2G and 3G cells, the UE reports the 2G cell information to the operator network.

Afterward, the UE receives a switching command for switching to the selected 3G cell from the operator network. According to the switching command, the UE is switched to the 3G network and attempts call setup. Since the measurement report message of the UE includes only the 3G cell information as described above, the operator network selects the 3G cell for CSFB according to the measurement report message.

Figure 4:
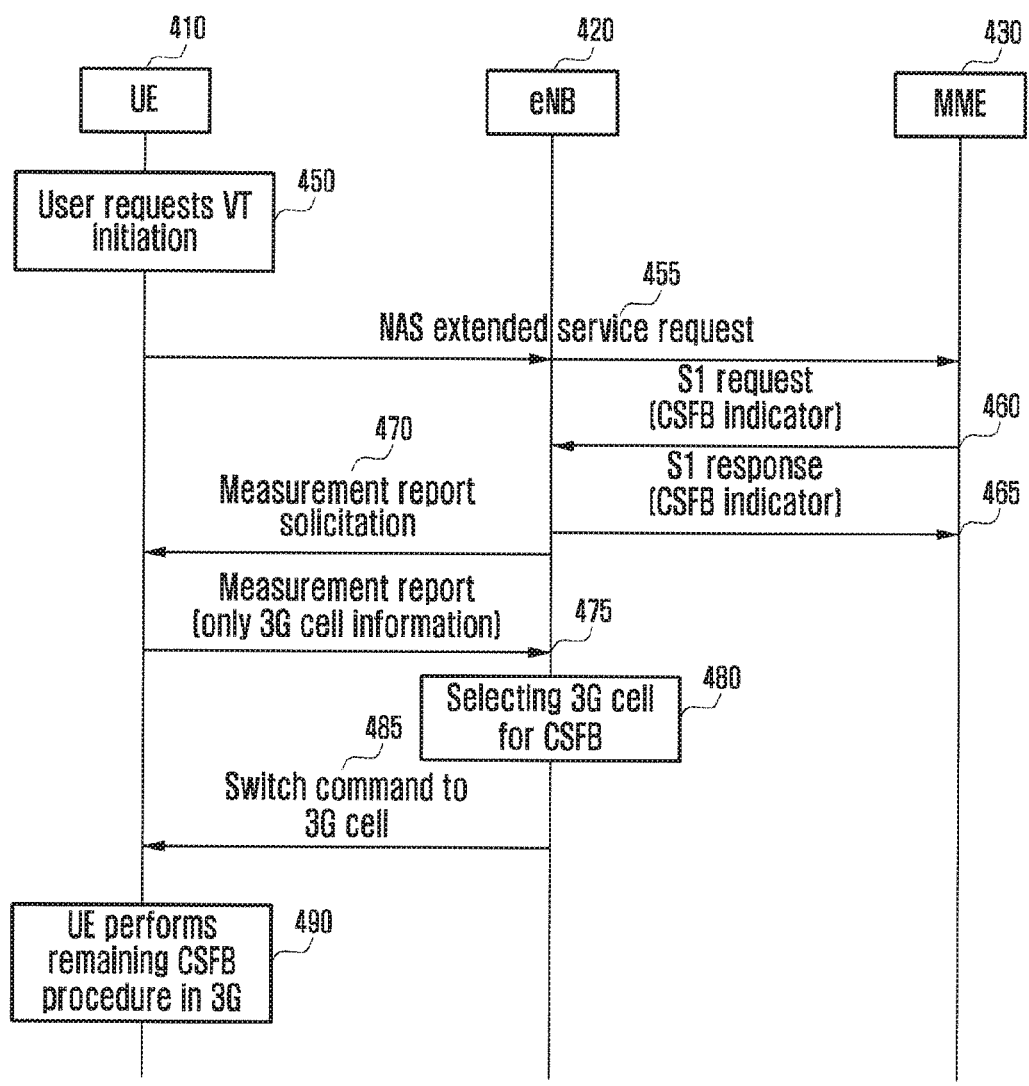
FIG. 4 illustrates an exemplary process for a mobile originating video telephony call processing procedure in the system according to various embodiments of the present disclosure.

FIG. 4 illustrates an exemplary process for a mobile originating video telephony call processing procedure in the system according to various embodiments of the present disclosure.

In step 450, the user places a video call in the state that the UE 410 is camped on the LTE network. In step 455, the UE 410 sends the currently connected operator network a call setup request message. When the UE 410 has the CSFB capability, the UE 410 sends the MME 430 an Extended Service Request message to notify of the necessity of CSFB via the eNB 420.

In step 460, when CSFB is available, the MME 430 sends the eNB 420 a CSFB execution message at. At this time, the UE 410 is in the idle mode, the MME 430 sends the eNB 420 an S1 initial context setup request message including a CSFB indicator. When the UE 410 is in the connected mode, the MME 430 sends the eNB 420 a S1 UE context modification request message including the CSFB indicator. In step 465, the eNB 420 sends the MME 430 a response message in reply to the CSFB execution message received at step 460. The response message includes the CSFB indicator.

In step 470, once the necessity of CSFB for the UE 410 is checked, the eNB 420 commands the UE 410 to report measurement result. The measurement report request message includes the measurement configuration information for use at the UE 410 in measurement. According to certain embodiments, the measurement configuration information includes the indication of the 2G and 3G cells as measurement targets. According to certain embodiments, the measurement configuration information includes the indication of the 3G cell as a measurement target.

In step 475, upon receipt of the measurement command at step 470, the UE 410 performs measurement based on the measurement configuration information and reports the measurement result. Although the 2G cell is accessible and measurement information is available to report, the UE 410 may not include the measurement information about the 2G cell in the measurement report message sent to the operator network. The UE 410 also includes the information informing of no accessible 2G cell in the measurement report message. Accordingly, the operator network takes the 3G cell into consideration to select the target cell for CSFB and thus the UE 410 is switched to the 3G network.

Although the measurement targets include both the 2G and 3G cells, the UE 410 performs measurement for the 3G cell to generate the report message. It is also possible for the UE 410 to perform measurement for 2G and 3G cells and, if a 3G cell is found, reports the 3G cell information to the operator network. When the 2G cell is found as a result of the measurement for 2G and 3G cells, the UE 410 reports the 2G cell information to the operator network.

In step 480, upon receipt of the measurement report message from the UE 410 at step 475, the eNB 420 selects a cell to switch the UE 410. Since the measurement report message of the UE 410 includes the 3G cell information, the eNB 420 selects the 3G cell for CSFB.

In step 485, the eNB 420 sends the UE 410 a switching command to switch the UE 410 to the selected 3G cell. The UE 410 switches its connection to the 3G network according to the switching command received from the eNB 420 and attempts call setup.

The description has been made hereinabove of the procedure of guiding the access to the 3G cell with the measurement report message of the UE for video telephony. Meanwhile, the video telephony requested by the UE is notified to the operator network explicitly, and the operator network selects a cell supporting the video telephony and including sufficient resource for the video telephony and notifies the UE of the selected cell. A description is made thereof hereinafter.

Figure 5:
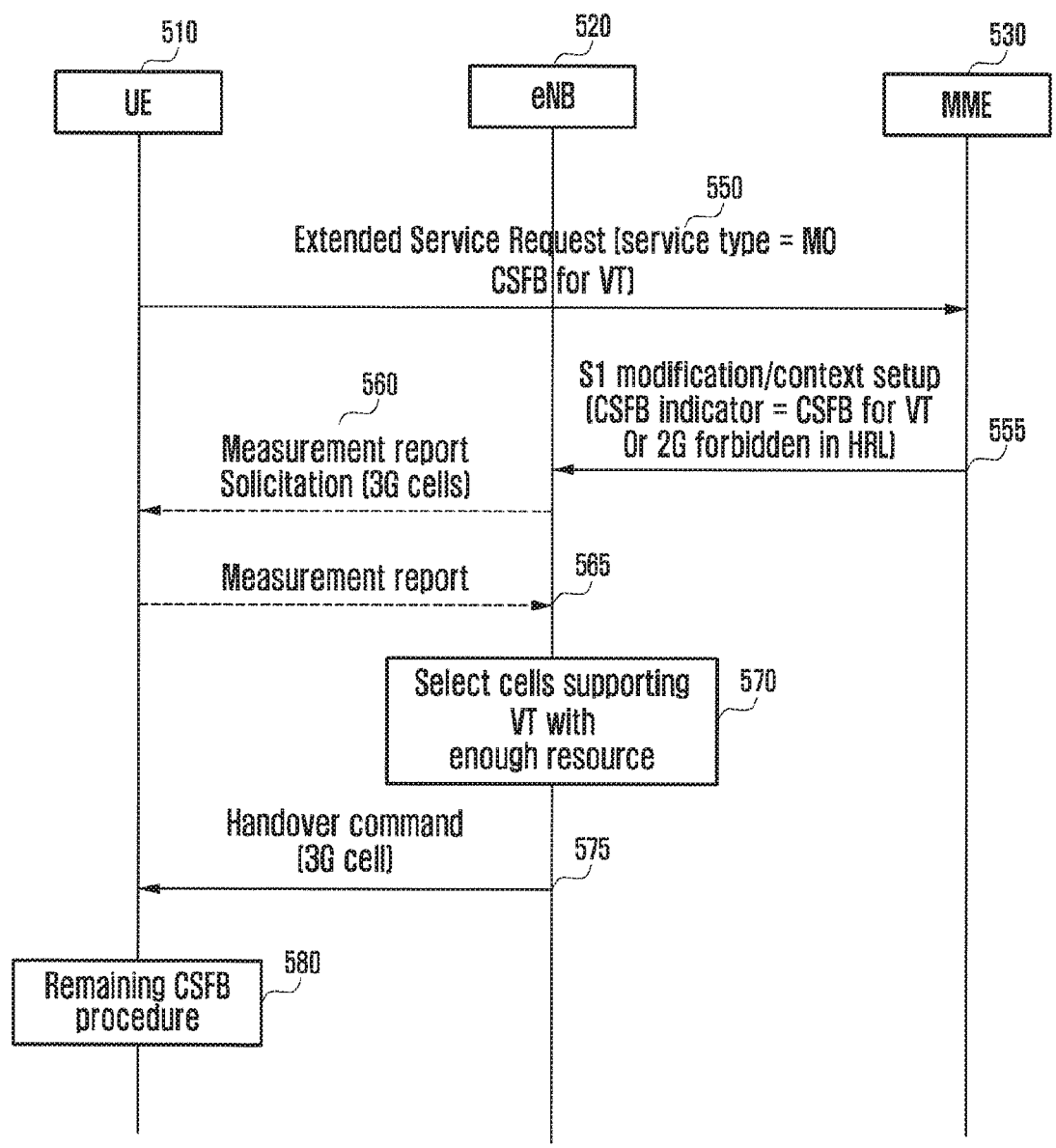
FIG. 5 illustrates an exemplary process for a mobile originating video telephony call processing procedure in the system according to various embodiment of the present disclosure.

FIG. 5 illustrates an exemplary process for a mobile originating video telephony call processing procedure in the system according to various embodiments of the present disclosure. Referring to FIG. 5, the UE 510 notifies the operator network of the video telephony call occurrence explicitly and then the operator network performs CSFB to switch the UE 510 to the cell supporting the video telephony.

In step 550, when the user places a video call in the state that the UE 510 is camped on the LTE network, the UE 510 sends the currently connected operator network a call setup request message. When the UE 510 has the CSFB capability, it sends the MME 530 an extended service request message via the eNB 520 to notify of the necessity of CSFB.

The UE 510 sends the call setup request message including the information indicating that the requested service is the video telephony service. For example, the service type field of the Extended Service Request message is set to Mobile Originated (MO) CSFB for Video Telephony. The UE 510 notifies the MME 530 of the service type information by setting one of the reserved bits of the service type field to indicate the CSFB for video telephony.

In step 555, when it is possible to apply CSFB, the MME 530 sends the eNB 520 a CSFB execution message. When the UE 510 is in the idle mode, the MME 530 sends the eNB 620 an S1 initial context setup request message including a CSFB indicator. When the UE 510 is in the connected mode, the MME 530 sends the eNB 520 a S1 UE context modification request message including the CSFB indicator. The CSFB execution message includes the information indicating that the CSFB is required for video telephony. For example, the CSFB indicator included in the CSFB execution message indicates video telephony. In step 570, the operator network (e.g. eNB 520) takes the 3G cell into consideration to select a target cell for CSFB at step 570. In step 575, the eNB 520 sends the UE 510 a message commanding to switch the connection to the selected 3G network. In step 580, the UE 510 is handed over to the 3G network (Packet Switched Handover (PSHO)) through CSFB.

According to certain embodiments, the MME 530 includes a handover restriction list (HRL) in the CSFB execution message transmitted to the eNB 520, the HRL forbidding 2G. Through this message, the eNB 520 becomes aware that the UE 510 is forbidden to access the 2G cell. In step 570, the eNB 520 takes the 3G cells into consideration to select a target cell for CSFB. In step 580, the eNB 520 sends the UE 510 a message commanding to switch its connection to the selected 3G cell at step 575, and the UE 510 is handed over to the 3G network (PSHO) through CSFB.

According to certain embodiments, the eNB 520 sends the UE 510 a message commanding to report measurement result at step 560. At this time, the measurement result report request message includes the information restricting the measurement target to 3G cells. In step 565, the UE 510 sends the eNB 520 the 3G cell measurement report at step 565. In step 570, the eNB 520 selects a cell for CSFB based on the received measurement result.

According to certain embodiments, the eNB 520 sends the UE 510 the CSFB execution command using a Handover Command (RRC connection reconfiguration message) at step 575. The switching command message includes the information on the switching c cells (cells supporting the video telephony) such as cell ID, operation frequency, and system information in part or in whole. When PSHO is not used for CSFB in the operator network, a similar method can be applied.

Figure 6:
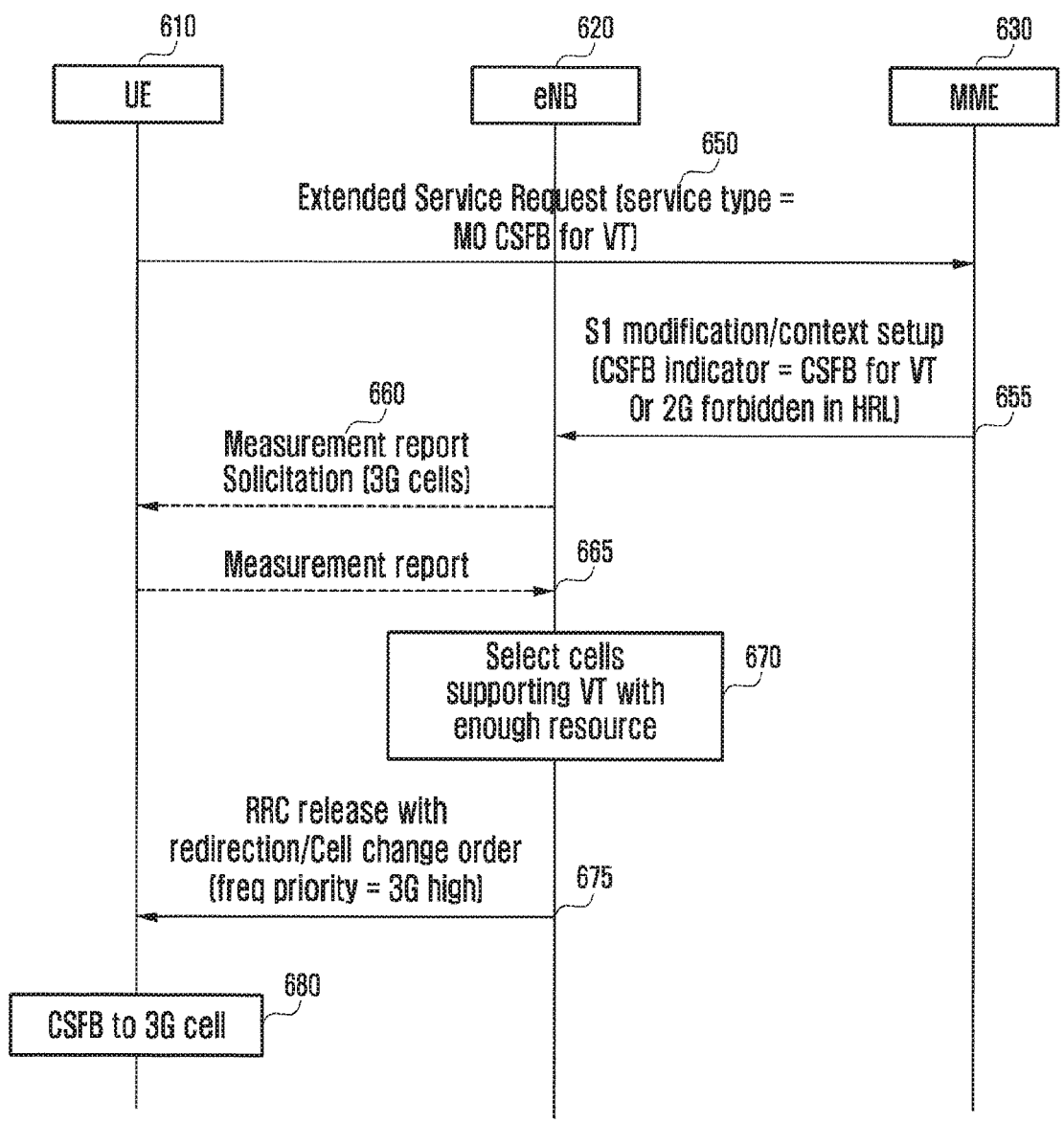
FIG. 6 illustrates an exemplary process for a mobile originating video telephony call processing procedure in the system according to various embodiments of the present disclosure.

FIG. 6 illustrates an exemplary process for a mobile originating video telephony call processing procedure in the system according to various embodiments of the present disclosure. Referring to FIG. 6, when CSFB occurs, the RRC Connection Release or Network Assisted Cell Change (NACC) can be used instead of PSHO. Such situation and problem can be overcome similarly as described in the embodiment of FIG. 5.

In step 650, when the user places a video call in the state that the UE 610 is camped on the LTE network, the UE 610 sends the currently connected operator network a call setup request message. When the UE 610 has the CSFB capability, it sends the MME 630 an extended service request message via the eNB 620 to notify of the necessity of CSFB.

The UE 610 sends the call setup request message including the information indicating that the requested service is the video telephony service. For example, the service type field of the extended service request message is set to Mobile Originated (MO) CSFB for Video Telephony. The UE 610 notifies the MME 630 of the service type information by setting one of the reserved bits of the service type field to indicate the CSFB for video telephony.

In step 655, when it is possible to apply CSFB, the MME 630 sends the eNB 620 a CSFB execution message. When the UE 610 is in the idle mode, the MME 630 sends the eNB 620 an S1 initial context setup request message including a CSFB indicator. When the UE 610 is in the connected mode, the MME 630 sends the eNB 620 a S1 UE context modification request message including the CSFB indicator.

According to certain embodiments, the eNB 620 commands the UE 610 to report the measurement result at step 660. The measurement result report request message includes the information on the 3G cell as the measurement target). The UE 610 sends the eNB 620 the 3G cell measurement result based on this information at step 665.

In step 670, the operator network takes the cells capable of supporting the video telephony service, e.g. 3G cells, into consideration to select a target cell for CSFB. In step 675, the eNB 620 sends the UE 610 a message commanding the UE 610 to switch its connection to the selected 3G cell. In step 680, the UE 610 is switched to the 3G network.

In step 675, the eNB 620 sends the UE 610 the RRC Connection Release or Cell Change Order command. The switching command message includes the information on the switching candidate cells (cells supporting video telephony service) such as cell ID, operation frequency, and system information in part or in whole. According to certain embodiments, the switching command message includes the information informing that the 3G cells have a higher priority. The UE 610 selects a switching target cell among the 3G cells with priority.

The above description is directed to the method in which the UE 610 notifies the operator network of the video telephony call occurrence explicitly and then the operator network selects a cell supporting the video telephone and having sufficient resource and notifies the UE 610 of the selected cell.

When a mobile originating video call occurs, the UE switches its connection to the 3G network autonomously, instead of requesting for CSFB through LTE network, to perform the video telephony call setup procedure immediately. In certain embodiments, when the UE has the 3G cell information (such as cell ID, frequency, signal strength, system information, and the like), it reuses the 3G cell information. Through this method, it is possible to increase the video telephony call setup success probability, especially when the probability of being switched to the 2G network is high for the CSFB request. A description is made thereof hereinafter.

Figure 7:
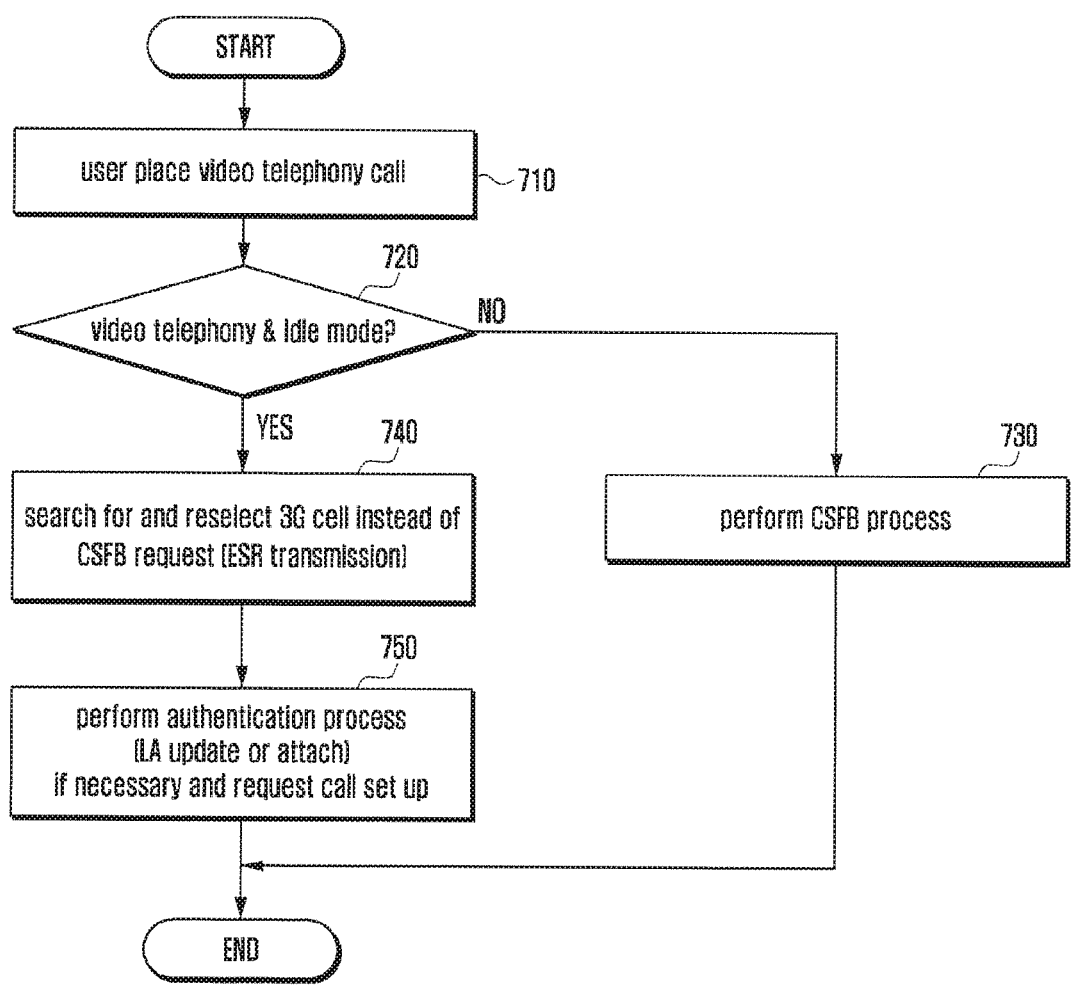
FIG. 7 illustrates an exemplary process for a UE operation for processing the mobile originating video telephony call according to various embodiment of the present disclosure.

FIG. 7 illustrates an exemplary process for a UE operation for processing the mobile originating video telephony call according to another embodiment of the present disclosure. Referring to FIG. 7, the UE detects a video call and switches its connection to the 3G network autonomously.

In step 710, a mobile originating call is detected. In step 720, the UE determines whether the call is a video telephony call or a voice telephony call.

In step 740, when it is determined that the call is the video telephony call and the UE is in the idle mode, the UE searches around for 3G cells instead of performing CSFB. The UE selects a 3G cell for switching it connection thereto.

In step 750, the UE switches its connection to the selected 3G cell. According to certain embodiments, an authentication process (LA update or Attach) is performed, if necessary. The UE requests for video call setup through the 3G cell. When the UE retains the 3G cell information (cell ID, frequency, system information, etc.), the 3G cell information is used in searching for, selecting, and connecting to the 3G cell.

In step 730, when it is determined that the call is the voice telephony call and the UE is in the connected mode at step 720, the UE performs CSFB.

The description has been made hereinabove of the procedure in which the UE detects a video telephony call and switches its connection to the 3G network autonomously.

When a mobile originating video call occurs, the UE performs CSFB process and, when it fails to set up the video call, switches is connection to a 3G cell for video call setup immediately. A description is made thereof hereinafter.

Figure 8:
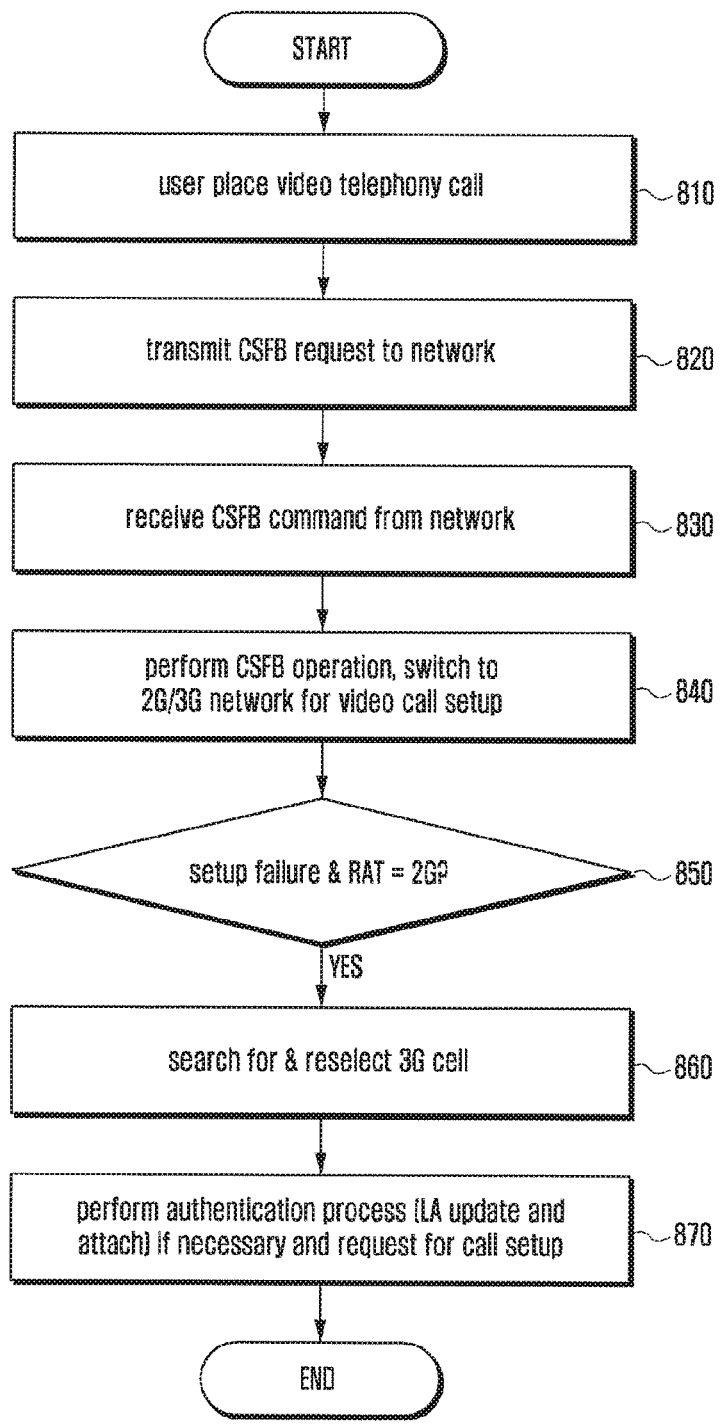
FIG. 8 illustrates an exemplary process for a UE operation for processing the mobile originating video telephony call according to various embodiment of the present disclosure.

FIG. 8 illustrates an exemplary process for a UE operation for processing the mobile originating video telephony call according to another embodiment of the present disclosure. Referring to FIG. 8, when it fails to set up the video telephony call, the UE attempts to switch its connection to the 3G cell for the video telephony call setup.

In step 810, the user places a video telephony call in the state that the UE is camped on the LTE network. In step 820, the UE sends the currently connected operator network a call setup request message. When the UE has the CSFB capability, it sends the operator network the extended service request message notifying of the necessity of CSFB.

The UE switches its connection to a 2G or 3G cell for video call setup according to the CSFB process through steps 830 and 840. In step 830, the UE receives a switching command, such as a message commanding to perform CSFB, from the operator network. In step 840, upon receipt of the switching command, the UE selects a 2G or 3G cell based on the information included in the switching command for video telephony call setup. When its connection is switched to the 2G cell in the CSFB process and if it fails to set up the video call due to the resource shortage, the UE searches around for a 3G cell to switch its connection thereto.

In step 850, the UE determines whether it has failed to set up the video telephony call and whether the cell to which its connection has been switched in the CSFB process is a 2G cell. In step 860, when it has failed to set up the video telephony call and the cell to which its connection has been switched is the 2G cell, the UE searches for 3G cells to select one of the found 3G cells at step 860.

In step 870, the UE switches its connection to the selected 3G cell. According to certain embodiments, an authentication process (LA update or Attach) is performed, if necessary. The UE requests for video call setup through the 3G cell. When 3G cell information (cell ID, frequency, system information, etc.) is stored in the UE, this information is used in the 3G cell search, selection, and attachment.

The description has been made hereinabove of the procedure in which when it has failed the vide telephony call setup the UE switches its connection to the 3G cell for video telephony call setup.

When the CSFB process is triggered by the user's video telephony call request, the operator network provides no cell information while switching the UE to a 2G or 3G network. This is called a blind cell selection that the UE selects a cell to access autonomously. In certain embodiments, when the priority of the 2G is higher than that of 3G by the Radio access type or Frequency of Selection Priority index or Service Profiling Identity (SPID), the UE selects the 2G cell with priority but it is necessary for the UE to select the 3G cell to prevent the video call setup from failing. A description is made of the method for accomplishing it hereinafter.

Figure 9:
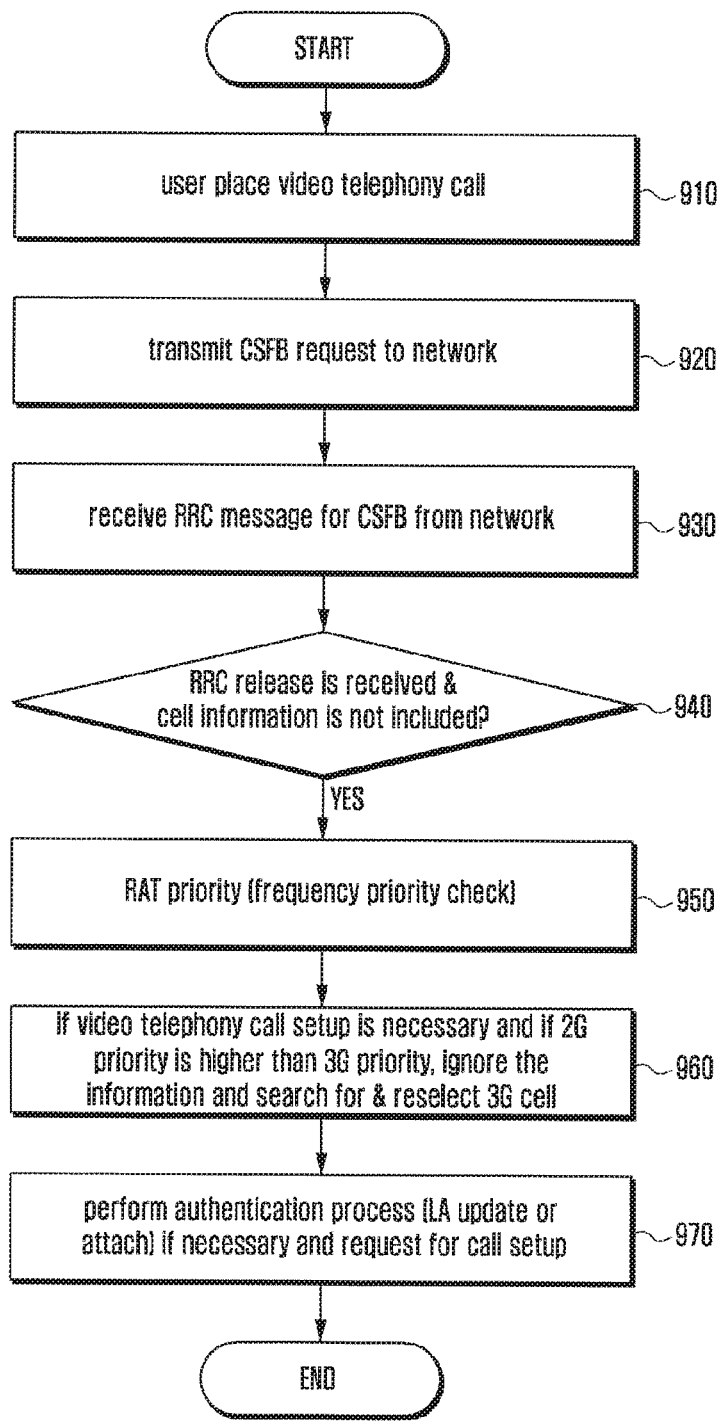
FIG. 9 illustrates an exemplary process for a UE operation for processing the mobile originating video telephony call according to various embodiment of the present disclosure.

FIG. 9 illustrates an exemplary process for a UE operation for processing the mobile originating video telephony call according to various embodiment of the present disclosure. Referring to FIG. 9, when the blind cell selection is performed in the CSFB procedure, the UE selects the 3G cell with priority.

In step 910, the user places a video telephony call in the state that the UE is camped on the LTE network. In step 920, the UE sends the currently connected operator network a call setup request message. When the UE has the CSFB capability, it sends the operator network the extended service request message to notify of the necessity of CSFB.

In step 930, the UE switches its connection to a 2G or 3G cell through the CSFB process for video telephony call setup. In step 930, the UE receives a switching command, i.e. an RRC message for CSFB, from the operator network.

When the command message received from the operator network in the CSFB process is the RRC Connection Release message containing no cell information at step 930, the UE has to select a cell to access autonomously. In step 940, the UE determines whether the RRC Connection Release message is received and whether this message includes no cell information.

In step 950, when the RRC Connection Release message is received and this message includes no cell information, the UE checks the priority of the 2G or 3G frequency. According to certain embodiments, the RRC Connection Release message includes the frequency priority configuration or the UE has the priority configuration on the 2G or 3G frequency already.

In step 960, as a result of checking the 2G or 3G frequency priority at step 950 and when the priority of the 2G is higher than that of the 3G and if the video telephony call setup is necessary, the UE ignores the configured priorities so as to search for 3G cells and select one of the found 3G cells with priority.

In step 970, the UE switches its connection to the selected 3G cell. According to certain embodiments, an authentication procedure (LA update or Attach) is performed, if necessary. When the 3G cell information (cell ID, frequency, system information, etc.) is stored in the UE, this information is used in the 3G cell search, selection, and attachment.

The description has been made hereinabove the procedure in which when the blind cell selection is applied in the CSFB process the UE selects the 3G cell with priority.

In the various embodiments of the present disclosure that are described with reference to FIGS. 2-9, when the user places a call, the UE determines whether the placed call is a video telephony call or a voice telephony call. This is accomplished in such a way that telephony software (e.g. software (SW) called dialer) notifies of the service type of the placed call requested to the communication function controller.

When the user places a video telephony call (such as when the user pushes the video telephony button or icon provided on the user interface of the communication software), the communication software requesting for the video telephony calls for the Application Program Interface (API).

The description has been made hereinabove of the UE procedure when a video telephony call is placed.

However, a similar problem occurs when the CSFB is applied in the mobile terminating video call processing procedure. A description is made of the embodiments for solving the problems occurring in the mobile terminating call processing procedure.

When a mobile terminating video telephony call occurs, a video telephony call setup request message arrives at the Mobile Switching Center (MSC) of the operator network. The MSC determines whether the received call is the video telephony call. The MSC requests the MME for paging to perform the reception CSFB process and notifies the MME that the call is the video telephony call. Upon receipt of the notification, the MME notifies the UE of the occurrence of the mobile terminating video telephony call via the eNB or directly. The UE attempts the call setup to the 3G cell using the method according to one of the embodiments of FIGS. 2-9 or a method similar thereto. The mobile terminating call processing procedure is identical with one of the embodiments of FIGS. 2-9 with the exception that the mobile originating call is replaced with the mobile terminating call and the UE uses the information on the type of the call which is received from the network instead of detected directly from the user request or input. Descriptions are made of the mobile terminating video telephony call processing procedures according to various embodiments of the present disclosure hereinafter.

Figure 10:
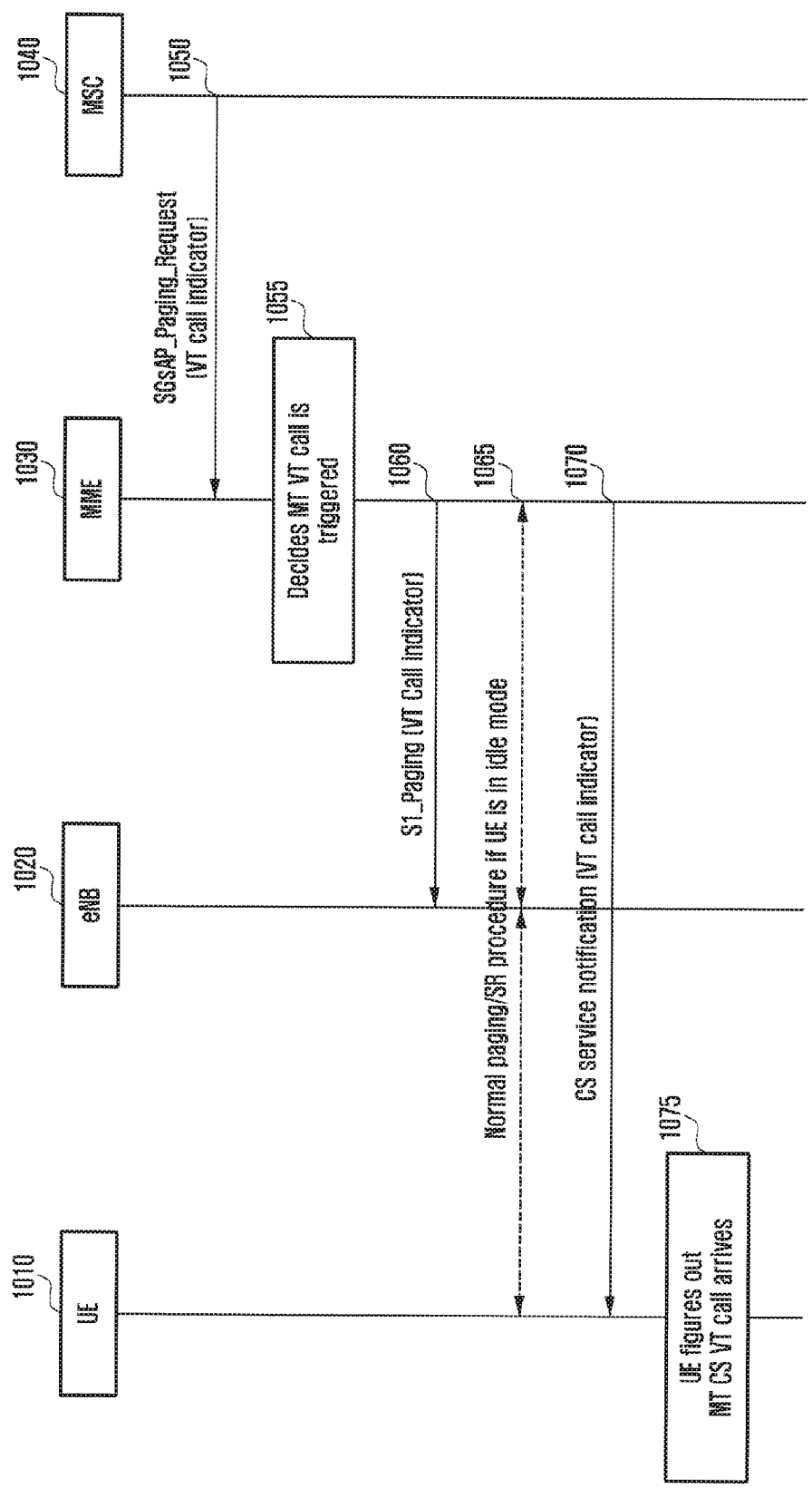
FIG. 10 illustrates an exemplary process for the mobile terminating video telephony call processing procedure in the system according to various embodiments of the present disclosure.

FIG. 10 illustrates an exemplary process for the mobile terminating video telephony call processing procedure in the system according to various embodiments of the present disclosure.

Referring to FIG. 10, when a mobile terminating call occurs, the MSC 1040 detects the call and notifies the UE of the type of the call via the LTE network entities 1030 and 1020. When a mobile terminating video telephony call occurs, the call arrives at the MSC 1040 of the operator network. The MSC 1040 determines whether the received call is the video telephony call.

In step 1050, when the UE 1010 is registered as the CSFB-capable UE (e.g. if the MSC has the SGs association towards MME 1030 for the UE 1010), the MSC 1040 sends the MME 1030 a paging request message, such as a SGsAP_Paging_Request message. The MSC notifies the MME 1030 that the received call is the video telephony call. In order to achieve this, a service indicator or an SS code is set to a value indicating the video telephony call. According to certain embodiments, the paging request message includes a separate identifier indicating that the received call is the video telephony call, such as a video telephony indicator.

In step 1055, upon receipt of the paging request message, the MME 1030 becomes aware of the occurrence of the video telephony call. The MME 1030 notifies the eNB 1020 and the UE 1010 of the occurrence of the mobile terminating video telephony call through two methods.

In step 1060, the UE 1010 sends the eNB 1020 the S1AP_Paging message including the information notifying that the mobile terminating call is the video telephony call. The information notifying of the occurrence of the mobile terminating video telephony call is the video telephony indicator, but is not limited thereto.

In step 1065, when the mobile terminating video telephony call occurs, the MME 1030 performs Packet-Switched (PS) paging, instead of Circuit-Switched (CS) paging, for CSFB to receive the service request message from the UE 1010. In step 1070, the MME 1030 sends the UE 1010 a CS service notification message including the information notifying that the mobile terminating call is the video telephony call. According to certain embodiments, when the UE 1010 is in the connected mode, step 1065 for receiving the PS paging and service request message is omitted.

Through the above procedure, the eNB 1020 or the UE 1010 is aware that the mobile terminating call is the video telephony call. In step 1075, the UE 1010 operates to switch its connection to the 3G cell with priority, as described in the above embodiments in FIGS. 2-9. Certain embodiments are identical with one of the embodiments of FIGS. 2-9 with the exception that the mobile originating call is replaced with the mobile terminating call and the eNB 1020 or the UE 1010 becomes aware of the occurrence of the mobile terminating video telephony call. It is obvious to those skilled in the art that the embodiments of FIGS. 2-9 can be modified without departing from the scope of the present disclosure, detailed description thereof is omitted herein.

The description has been made hereinabove of the procedure in which the MSC notifies the UE or the eNB of the type of the mobile terminating call.

When the MME becomes aware that the received call is the video telephony call, it notifies the eNB that the 2G cell access of the UE is not permitted. Upon receipt of this notification message, the eNB takes only the 3G cells into consideration as the candidates for CSFB. A description is made thereof hereinafter.

Figure 11:
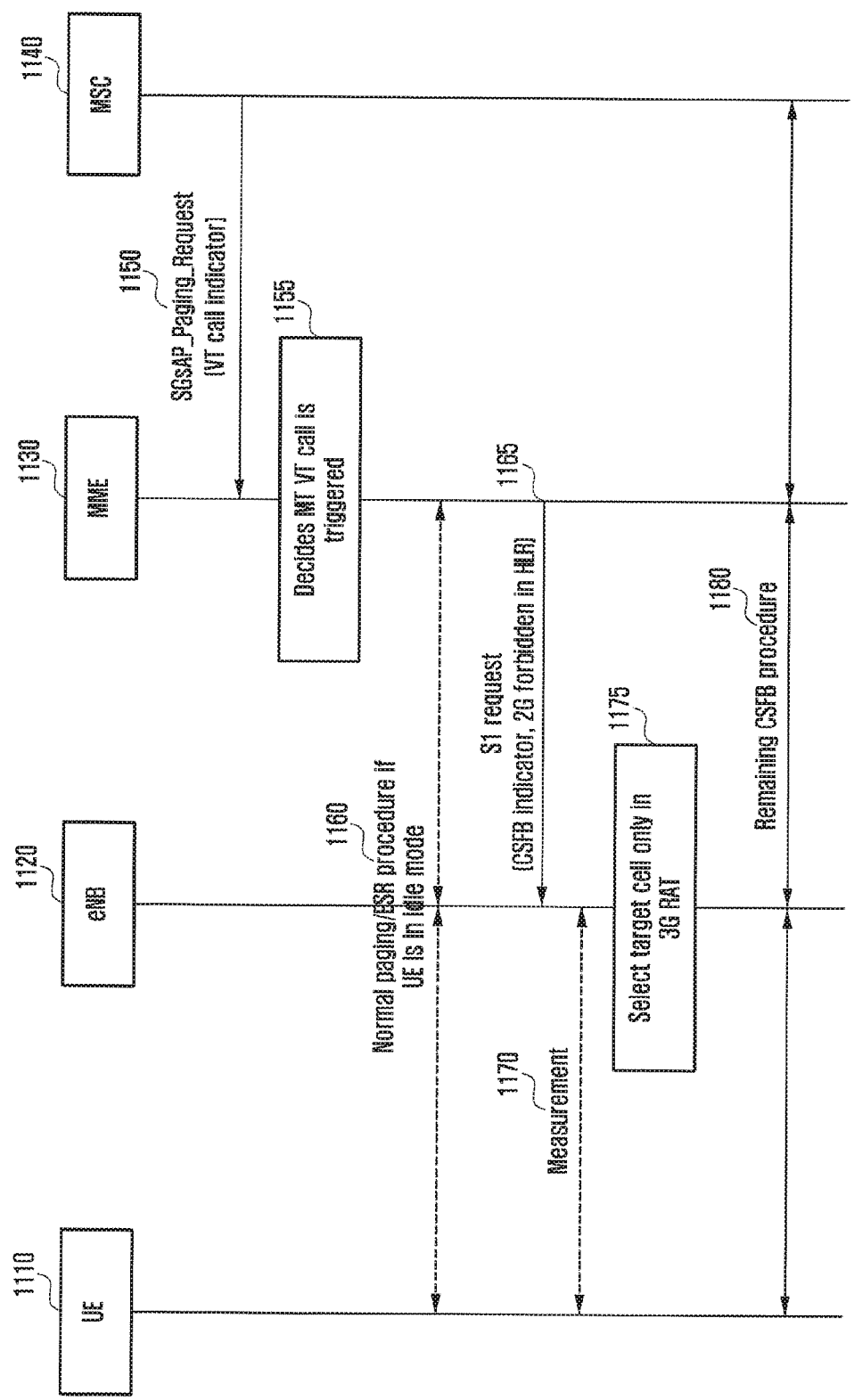
FIG. 11 illustrates an exemplary process for a mobile terminating video telephony call processing procedure in the system according to various embodiment of the present disclosure.

FIG. 11 illustrates an exemplary process for a mobile terminating video telephony call processing procedure in the system according to various embodiments of the present disclosure.

Referring to FIG. 11, the MME 1130 becomes aware of the occurrence of the mobile terminating video telephony call, it notifies the eNB 1110 that the switching of the UE to the 2G cell is prohibited. When a mobile terminating video telephony call occurs, it arrives at the MSC 1140 of the operator network. The MSC 1140 determines whether the received mobile terminating call is the video telephony call. When the UE 1110 is registered as the CSFB-capable UE (such as when the MSC 1140 has the SGs association towards MME 1130 for the UE 1110), the MSC 1140 sends the MME 1130 a paging request message, such as an SGsAP_Paging_Request message at step 1150. At this time, the MSC 1140 notifies the MME 1130 that the received call is the video telephony call. In order to achieve this, a service indicator or an SS code is set to a value indicating the video telephony call. According to certain embodiments, the paging request message includes a separate identifier indicating that the received call is the video telephony call, such as a video telephony indicator.

In step 1155, upon receipt of the paging request message, the MME 1130 becomes aware of the occurrence of the video telephony call. In step 1160, when the UE 1110 is in the idle mode, the MME 1130 performs the paging process.

In step 1165, the MME 1130 sends the eNB 1120 a S1 request message (e.g. Initial Context Setup request when the UE 1110 is in the idle mode, and context modification request when the UE 1110 is in the connected mode) including an indicator notifying of the CSFB occurrence (e.g. CSFB indicator) and the HRL to restrict the handover of the UE to the 2G cell. For example, the HRL forbidding the access to the 2G cell is included in the S1 request message.

When the UE 1110 is in the connected mode, the MME 1130 sends the eNB 1120 a Downlink NAS transport message including the CS service notification message addressed to the UE 1110 before step 1165 and the HLR informing that the access to the 2G cell is forbidden other than the UE context notification message including the HRL.

Afterward, the eNB 1120 is aware that the 2G cell access of the UE is forbidden and thus performs the rest part of the procedure by taking only 3G cells into consideration as switching candidates in the CSFB process. The detailed operation through steps 1170 to 1180 are performed as a modified process of one of the embodiments described with reference to FIGS. 2-9.

The description has been made hereinabove of the procedure in which when MME becomes aware of the mobile terminating video telephony call it notify the eNB that the switching the UE to the 2G cell is forbidden.

When the mobile terminating video telephony call occurs, the MME configures the priority of the 2G cell to be higher than that of the 3G cell for the UE to guide the UE to access the 3G cell with priority. A description thereof is made hereinafter.

Figure 12:
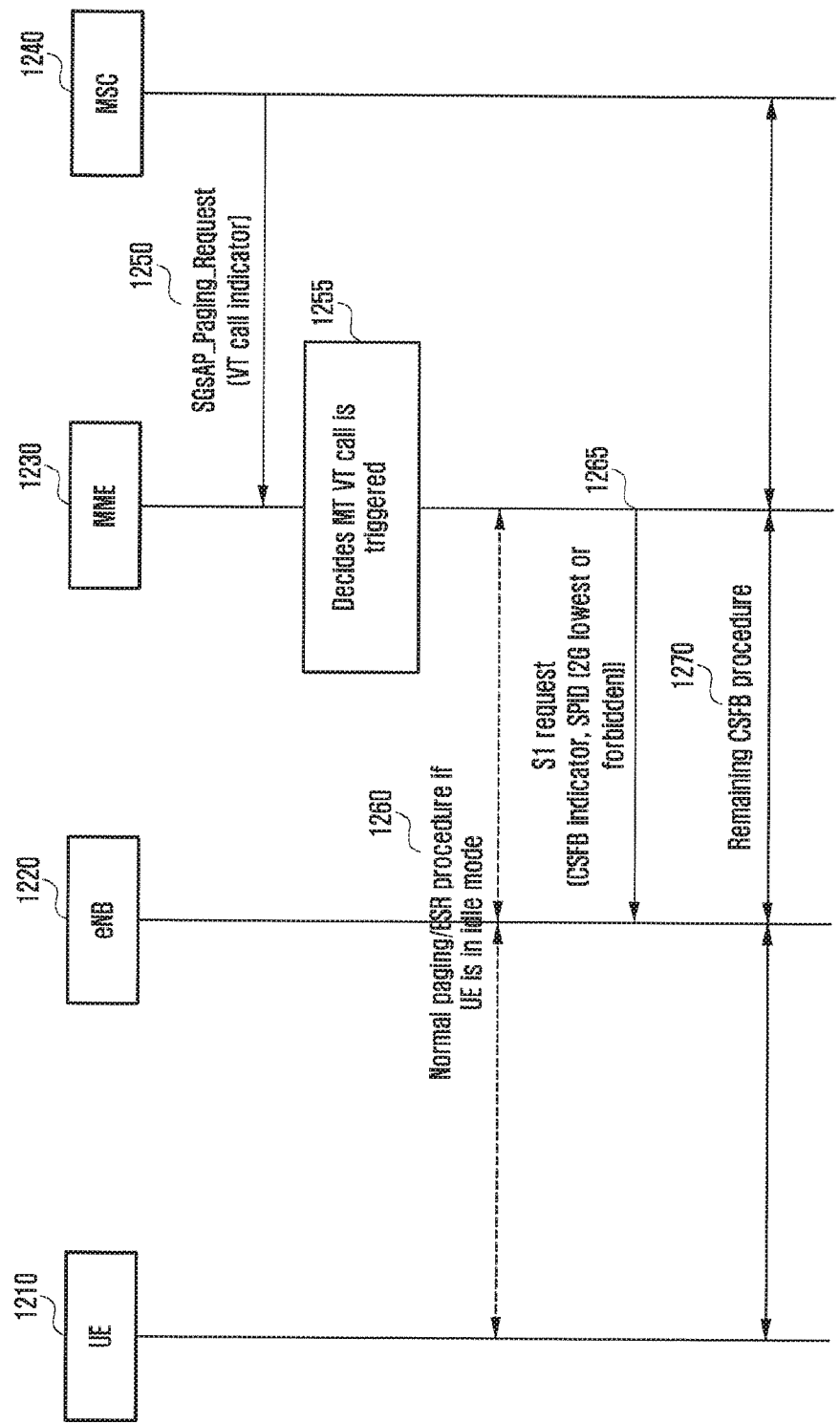
FIG. 12 illustrates an exemplary process for a mobile terminating video telephony call processing procedure in the system according to various embodiment of the present disclosure.

FIG. 12 illustrates an exemplary process for a mobile terminating video telephony call processing procedure in the system according to various embodiments of the present disclosure. Referring to FIG. 12, when a mobile terminating video telephony call occurs, the UE 1210 attempts to access the 3G cell with priority.

When a mobile terminating video telephony call occurs, it arrives at the MSC 1140 of the operator network. The MSC 1240 determines whether the received mobile terminating call is the video telephony call. In step 1250, when the UE 1210 is registered as the CSFB-capable UE (e.g. if the MSC 1240 has the SGs association towards MME 1230 for the UE 1210), the MSC 1240 sends the MME 1230 a paging request message, e.g. SGsAP_Paging_Request message. The MSC 1240 notifies the MME 1230 that the received call is the video telephony call. In order to achieve this, a service indicator or an SS code is set to a value indicating the video telephony call. According to certain embodiments, the paging request message includes a separate identifier indicating that the received call is the video telephony call, e.g. video telephony indicator.

In step 1255, upon receipt of the paging request message, the MME 1230 becomes aware of the occurrence of the video telephony call. In step 1260, when the UE 1210 is in the idle mode, the MME 1230 performs the paging process.

The MME 1230 sends the eNB 1220 a S1 request message (such as an Initial Context Setup request when the UE 1210 is in the idle mode and a context modification request when the UE 1210 is in the connected mode) including an indicator notifying of the CSFB occurrence (such as a CSFB indicator) and the SPID notifying of the relative priority in order the UE 1210 in the idle mode to select the 3G cell with priority rather than 2G cell. For example, the SPID having an indication in which the 2G is set to forbidden or allocated the lowest priority is included in the S1 request message.

When the UE 1210 is in the connected mode, the MME 1230 sends the eNB 1220 a Downlink NAS transport message including the CS service notification message addressed to the UE 1210 before step 1265 and the SPID informing that the UE 1210 in the idle mode has to select the 3G cell with priority rather than 2G.

Afterward, the eNB 1220 is aware that the 3G cell has the priority higher than that of the 2G cell. The eNB 1220 performs the rest part of the procedure by taking only 3G cells into consideration as switching candidates in the CSFB process. The detailed operation at step 1270 is performed as a modified process of one of the embodiments described with reference to FIGS. 2-9, and thus detailed description thereof is omitted herein.

The description has been made hereinabove of the UE operation in the mobile terminating video telephony call processing procedure. Descriptions are made of the structures of the UE and the eNB according to various embodiments of the present disclosure hereinafter.

Figure 13:
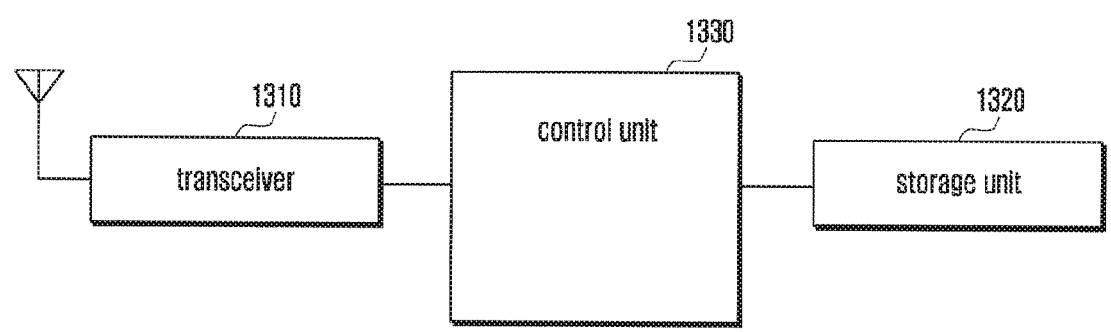
FIG. 13 illustrates a configuration of the UE according to various embodiments of the present disclosure.

FIG. 13 illustrates a configuration of the UE according to various embodiments of the present disclosure. As shown in FIG. 13, the UE according to certain embodiments of the present disclosure includes a transceiver 1310, a storage unit 1320, and a control unit 1330.

The transceiver 1310 is responsible for radio communication of the UE for transmitting or receiving data. The transceiver 1310 includes a Radio Frequency (RF) transmitter for up-converting and amplifying the transmission signal and an RF receiver for low noise amplifying and down-converting the received signal. The transceiver 1310 transfers the data received through the radio channel to the control unit 1330 and transmits the data output from the control unit 1330 through the radio channel.

The storage unit 1320 stores programs and data necessary for the operation of the UE.

The control unit 1330 controls the signal flows among the function blocks for the UE to operate according to certain embodiments of the present disclosure. For example, the control unit 1330 controls transmitting a video telephony call setup request message, receiving a switching command for CSFB, and switching, when the target cell indicated by the switching command is a 2G cell and there is a 3G cell which the UE can access, the connection to the 3G cell for video telephony call setup. The control unit 1330 also controls receiving a measurement report request message from an eNB and transmitting a measurement report message including the information only on the 3G cell measurement result.

The control unit 1330 also controls the UE to operate according to another embodiment of the present disclosure.

Figure 14:
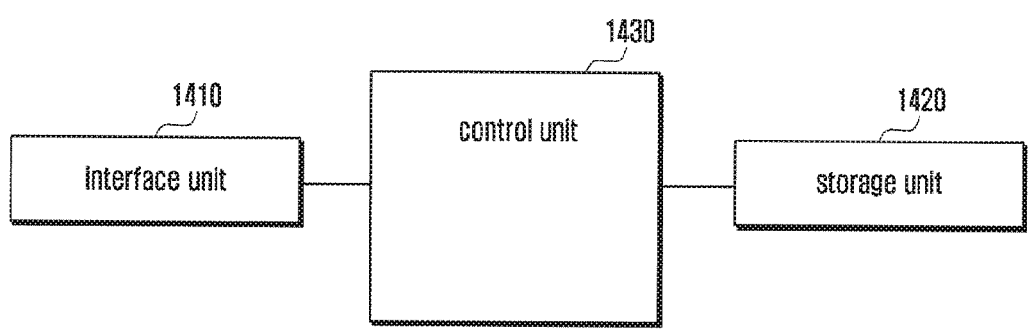
FIG. 14 illustrates a configuration of the eNB according to various embodiments of the present disclosure.

FIG. 14 illustrates a configuration of the eNB according to various embodiments of the present disclosure. As shown in FIG. 14, the eNB according to certain embodiments of the present disclosure includes an interface unit 1410, a storage unit 1420, and a control unit 1430.

The interface unit 1410 is responsible for a signal processing function for wired communication of the eNB. The interface unit 1410 includes a transceiver.

The storage unit 1420 stores programs and data necessary for the operation of the eNB.

The control unit 1430 controls the signal flows among the function blocks for the eNB to operate according to certain embodiments of the present disclosure. For example, the control unit 1430 controls receiving a video telephony call setup request message from the UE, receiving a message including the information for execution of CSFB from an MME, transmitting a measurement report request message to the UE, receiving a measurement report message including the measurement result information only on the 3G cell, selecting a target cell for switching the connection of the UE thereto, and transmitting a switching command including the information on the switching target cell to the UE. The control unit 1430 also controls transmitting a measurement report request message including the information indicating 3G cell as the measurement target to the UE.

The control unit 1430 also controls the eNB to operate according to another embodiment of the present disclosure.

Figure 15:
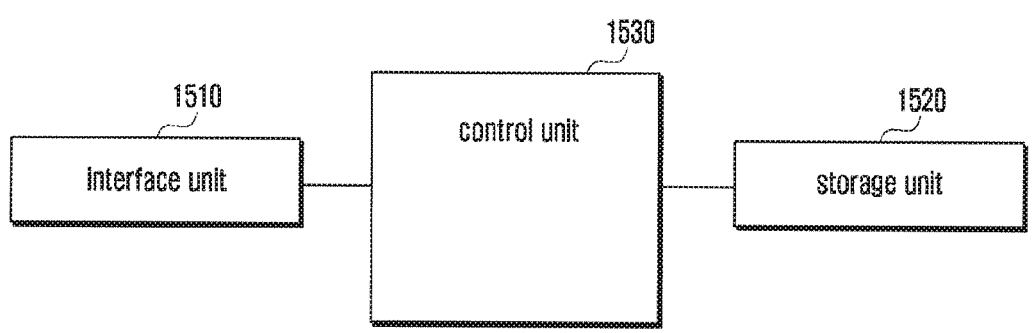
FIG. 15 illustrates a configuration of the MME according to various embodiments of the present disclosure.

FIG. 15 is a block diagram illustrating a configuration of the MME according to various embodiments of the present disclosure. As shown in FIG. 15, the MME according to certain embodiments of the present disclosure includes an interface unit 1510, a storage unit 1520, and a control unit 1530.

The interface unit 1510 is responsible for a signal processing function for wired communication of the MME. The interface unit 1510 includes a transceiver.

The storage unit 1520 stores programs and data necessary for the operation of the MME.

The control unit 1530 controls the signal flows among the function blocks for the MME to operate according to certain embodiments of the present disclosure. For example, the control unit 1530 controls receiving a video telephony call setup request message from a UE and transmitting a message including the information for CSFB execution to the eNB. The control unit 1530 also controls receiving a paging message including the information notifying of the mobile terminating video telephony call occurrence and transmitting a message including the information notifying the eNB or the UE of the mobile terminating vide telephony call occurrence.

The control unit 1530 also controls the MME to operate according to another embodiment of the present disclosure. In the above described embodiments, the operation steps can be performed or omitted selectively. Also, it is not compulsory to perform the operation steps in the order as described in each embodiment but can be performed in different orders.

As described above, the video telephony service quality enhancement method and apparatus of the present disclosure is advantageous in terms of switching, when a video telephony is made, the UE to the network supporting the video telephony quickly.

Also, the video telephony service quality enhancement method and apparatus of the present disclosure is advantageous in terms of preventing the UE from being switched to a network which does not support video telephony or a network which supports the video telephony but has insufficient data transmission resource (such as 2G network) and switching the UE to the network suitable for video telephony so as to protect against call setup failure or service quality degradation.

The advantages of the present disclosure are not limited to the aforesaid, and other advantages not described herein be clearly understood by those skilled in the art from the descriptions below.

Although preferred embodiments of the disclosure have been described using specific terms, the specification and drawings are to be regarded in an illustrative rather than a restrictive sense in order to help understand the present disclosure. It is obvious to those skilled in the art that various modifications and changes can be made thereto without departing from the broader spirit and scope of the disclosure.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A communication method performed by a base station in a wireless communication system, the method comprises:
   receiving, from a mobility management entity (MME) of a first access network, a context setup request message including at least one of information indicating circuit switched fall back (CSFB) or a handover restriction list (HRL) for a third access network, in case that a terminal is in an idle mode;
   receiving, from the MME of the first access network, a context modification request message including at least one of the information indicating the CSFB or the HRL for the third access network, in case that the terminal is in a connected mode;
   transmitting, to the terminal, configuration information on a measurement for a second access network and the third access network based on at least one of the received context setup request message or the received context modification request message;
   receiving, from the terminal, a measurement report message including a first measurement result for the second access network based on the configuration information, and not including a second measurement result for the third access network, in case that a first measurement for the second access network and a second measurement for the third access network are performed by the terminal; and
   transmitting, to the terminal, command information on the CSFB based on the first measurement result.

2. The method of claim 1, wherein the first access network includes a 4th generation (4G) network, and
   wherein the 4G network includes at least one of a long term evolution (LTE) system or a long term evolution advanced (LTE-A) system.

3. The method of claim 1, wherein the second access network includes a 3rd generation (3G) network,
   wherein the 3G network includes universal mobile telecommunications system (UMTS).

4. The method of claim 1, wherein the third access network includes a 2nd generation (2G) network, and
   wherein the 2G network includes global system for mobile communications (GSM).

5. The method of claim 1, wherein the command information includes a handover command, and
   wherein the command information includes information indicating that a cell of the second access network has a higher priority for the CSFB.

6. A base station of a wireless communication system, the base station comprising:
   a transceiver; and
   a control unit configured to:
      receive, from a mobility management entity (MME) of a first access network via the transceiver, a context setup request message including at least one of information indicating circuit switched fall back (CSFB) or a handover restriction list (HRL) for a third access network, in case that a terminal is in an idle mode,
      receive, from the MME of the first access network via the transceiver, a context modification request message including at least one of the information indicating the CSFB or the HRL for the third access network, in case that the terminal is in a connected mode,
      transmit, to the terminal via the transceiver, configuration information on a measurement for a second access network and the third access network based on at least one of the received context setup request message or the received context modification request message,
      receive, from the terminal, a measurement report message including a first measurement result for the second access network based on the configuration information, and not including a second measurement result for the third access network, in case that a first measurement for the second access network and a second access measurement for the third access network are performed by the terminal, and
      transmit, to the terminal, a command information on the CSFB based on the first measurement result.

7. The base station of claim 6, wherein the first access network includes a 4th generation (4G) network, and
   wherein the 4G network includes at least one of a long term evolution (LTE) system or a long term evolution advanced (LTE-A) system.

8. The base station of claim 6, wherein the second access network includes a 3rd generation (3G) network,
   wherein the 3G network includes universal mobile telecommunications system (UMTS).

9. The base station of claim 6, wherein the third access network includes a 2nd generation (2G) network, and
   wherein the 2G network includes global system for mobile communications (GSM).

10. The base station of claim 6, wherein the command information includes a handover command, and
    wherein the command information includes information indicating that a cell of the second access network has a higher priority for the CSFB.

11. A communication method performed by a mobility management entity (MME) of a first access network in a wireless communication system, the method comprising:
    receiving, from a terminal, a call setup request message including information requesting circuit switched fall back (CSFB) for a video call;
    transmitting, to a base station, a context setup request message including at least one of information indicating the CSFB or a handover restriction list (HRL) for a third access network, in case that the terminal is in an idle mode; and
    transmitting a context modification request message including at least one of the information indicating the CSFB or the HRL for the third access network to the base station, in case that the terminal is in a connected mode,
    wherein the context setup request message or the context modification request message instructs the base station to:
       transmit, to the terminal, configuration information on a measurement for a second access network and the third access network based on at least one of the received context setup request message or the received context modification request message, and
       receive, from the terminal, a measurement report message including a first measurement result for the second access network based on the configuration information and not including a second measurement result for the third access network, in case that a first measurement for the second access network and a second measurement for the third access network are performed by the terminal.

12. The method of claim 11, wherein the HRL includes information indicating that access to a cell of the third access network is forbidden, and wherein at least one of the context setup request message or the context modification request message includes information indicating that the CSFB is for the video call.

13. The method of claim 11, further comprising:
receiving a paging message including information indicating a video call from a mobile switching center (MSC); and
determining that a received call is the video call based on the information indicating the video call.

14. The method of claim 11, wherein the first access network includes a 4th generation (4G) network, and the 4G network includes at least one of a long term evolution (LTE) system or a long term evolution advanced (LTE-A) system,
wherein the second access network includes a 3rd generation (3G) network, and the 3G network includes a universal mobile telecommunications system (UMTS), and
wherein the third access network includes a 2nd generation (2G) network, and the 2G network includes a global system for mobile communications (GSM).

15. The method of claim 13, further comprising performing a paging procedure if the terminal is in the idle mode, and
wherein at least one of the context setup request message or the context modification request message further includes information indicating that a priority of a cell of the third access network is lowest.

16. A mobility management entity (MME) of a first access network in a wireless communication system, the MME comprising:
a transceiver; and
a control unit configured to:
receive, from a terminal via the transceiver, a call setup request message including information requesting circuit switched fall back (CSFB) for a video call,
transmit, to a base station via the transceiver, a context setup request message including at least one of information indicating the CSFB or a handover restriction list (HRL) for a third access network, in case that the terminal is in an idle mode, and
transmit, to the base station via the transceiver, a context modification request message including at least one of the information indicating the CSFB or the HRL for the third access network, in case that the terminal is in a connected mode,
wherein the context setup request message or the context modification request message instructs the base station to:
transmit, to the terminal, configuration information on a measurement for a second access network and the third access network based on at least one of the received context setup request message or the received context modification request message, and
receive, from the terminal, a measurement report message including a first measurement result for the second access network based on the configuration information and not including a second measurement result for the third access network, in case that a first measurement for the second access network and a second measurement for the third access network are performed by the terminal.

17. The MME of claim 16, wherein the HRL includes information indicating that access to a cell of the third access network is forbidden, and
wherein at least one of the context setup request message or the context modification request message includes information indicating that the CSFB is for the video call.

18. The MME of claim 16, wherein the control unit is further configured to:
control the transceiver to receive a paging message including information indicating a video call from a mobile switching center (MSC), and
determine that a received call is the video call based on the information indicating the video call.

19. The MME of claim 16, wherein the first access network includes a 4th generation (4G) network, and the 4G network includes at least one of a long term evolution (LTE) system or a long term evolution advanced (LTE-A) system,
wherein the second access network includes a 3rd generation (3G) network, and the 3G network includes a universal mobile telecommunications system (UMTS), and
wherein the access network includes a 2nd generation (2G) network, and the 2G network includes a global system for mobile communications (GSM).

20. The MME of claim 18, wherein the control unit is further configured to perform a paging procedure if the terminal is in the idle mode, and
wherein at least one of the context setup request message or the context modification request message further includes information indicating that a priority of a cell of the third access network is lowest.

* * * * *